United States Patent Office 2,809,495
Patented Oct. 15, 1957

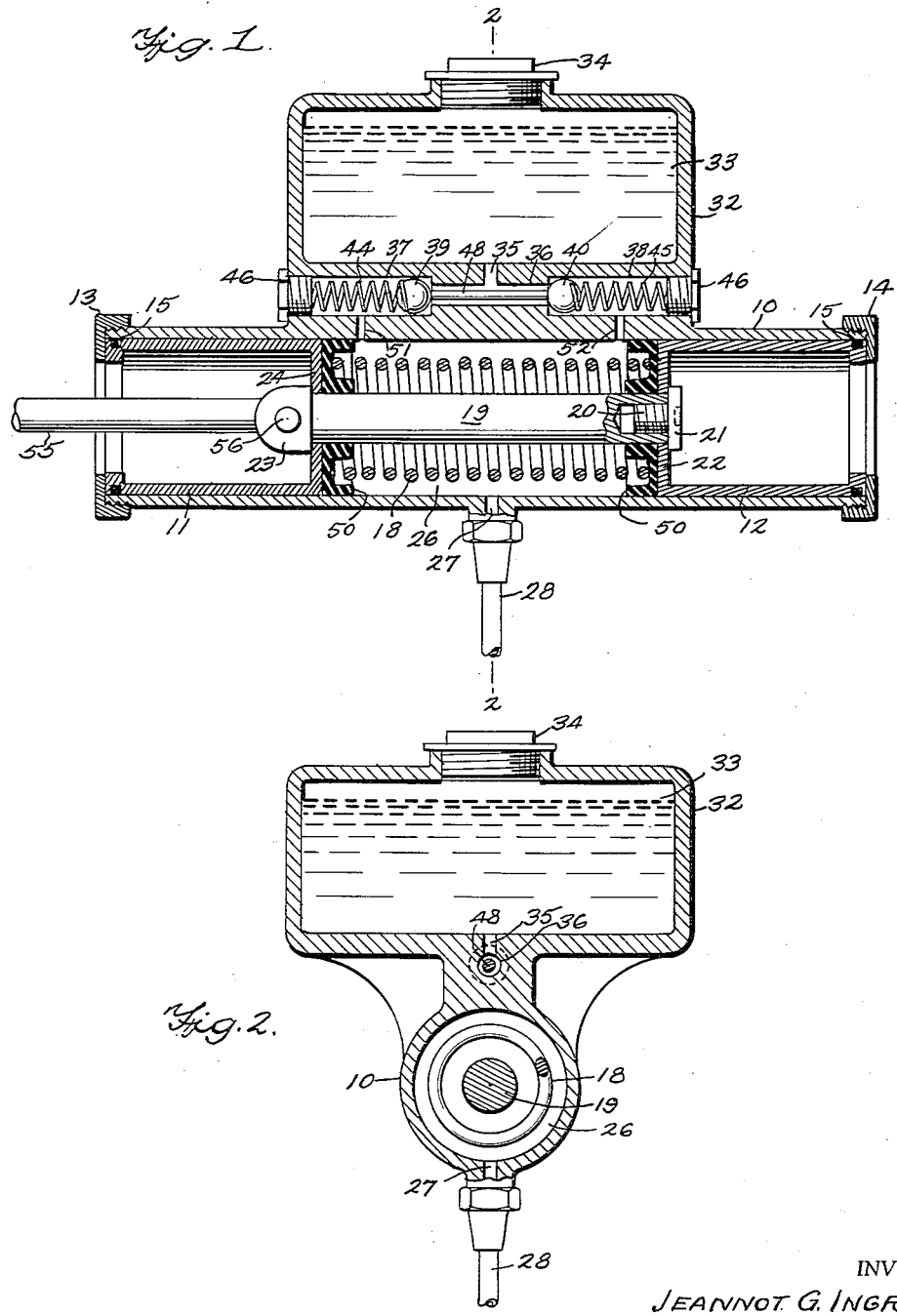

2,809,495

MASTER CYLINDER FOR HYDRAULIC BRAKE SYSTEMS

Jeannot G. Ingres, Dearborn, Mich., assignor to Kelsey-Hayes Company, a corporation of Delaware Application August 31, 1953, Serial No. 377,463

7 Claims. (Cl. 60—54.6)

This invention relates to a master cylinder for hydraulic brake systems, and particularly the brake systems of motor vehicles.

Conventionally, a master cylinder is employed having a piston therein connected to the brake pedal of the vehicle and the piston is movable in one direction upon depression of the brake pedal to displace hydraulic fluid into the brake system to apply the brakes. It has been proposed to utilize power of the motor vehicle taken for example from the propeller shaft, for operating fluid displacing means for applying the brakes. Inasmuch as the propeller shaft rotates in one direction when the vehicle is going forwardly and in the other direction when the vehicle is moving rearwardly, it is difficult to provide simplified means for utilizing power from the propeller shaft, regardless of its direction of rotation, for applying the brakes. It has been proposed, for example, to provide two master cylinders in end-to-end relation each having a piston therein and one of the pistons will be operated by a rocker means deriving its power from the propeller shaft. Such an arrangement is relatively complicated and expensive in that it requires the use of two cylinders and two pistons.

An important object of the present invention is to provide a highly simplified master cylinder having a single operating element movable in either direction to displace fluid from the master cylinder into the brake lines.

A further object is to provide a master cylinder having two pistons therein in spaced end-to-end relation and defining therebetween a hydraulic fluid chamber, and to provide means comprising a single element for applying force to one of said pistons upon movement of such single element in either direction.

A further object is to provide a master cylinder of the type referred to wherein the single operating element is in the form of a rod extending between the two pistons, movement of the rod in one direction actuating one of the pistons while moving freely relative to the other, and reverse movement of the single element reversing the operation by actuating the other piston while moving freely relative to the piston which was actuated by movement of the rod in the first named direction.

A further object is to provide such a construction wherein both ends of the master cylinder chamber are in communication with a reservoir, and wherein means is provided for closing communication between one end of the master cylinder and the reservoir upon movement of the piston at the other end of the master cylinder, thus preventing movement of either piston from forcing fluid back into the reservoir through the replenishing opening at the other end of the master cylinder.

Other objects and advantages of the invention will become apparent during the course of the following description.

In the drawing I have shown one embodiment of the invention. In this showing:

Figure 1 is a central longitudinal sectional view through the master cylinder and associated elements, parts being broken away, and Figure 2 is a transverse vertical sectional view on line 2—2 of Figure 1.

Referring to the drawing the numeral 10 designates a master cylinder as a whole having mounted therein a pair of pistons 11 and 12, which pistons are selectively movable inwardly by means to be described. The ends of the master cylinder are provided with caps 13 and 14 respectively forming stop means for the pistons 11 and 12 as shown in the normal off positions of the pistons in Figure 1. The pistons are suitably sealed against leakage, for example by O rings 15.

A return spring 18 of the compression type engages at its ends against the respective pistons 11 and 12 to bias these pistons against their respective stop rings 13 and 14. A rod 19 extends through both pistons and is slidable with respect thereto. The rod 19 is provided at one end with a screw 20 having an enlarged head 21 of greater diameter than the rod 19 to form an annular shoulder engageable with the inner head 22 of the piston 12. The other end of the rod 19 is provided with a head 23 performing the same function relative to the piston 11. In other words, the head 23 is larger than the rod 19 to form a shoulder engageable with the head 24 of the piston 11. The space between the pistons 11 and 12 forms a hydraulic fluid chamber 26 from which fluid is adapted to be displaced in a manner to be described through an outlet port 27 and thence through a pipe line, a section of which is indicated by the numeral 28, leading to the brake cylinders of the motor vehicle wheels.

A reservoir 32 is arranged above the master cylinder 10 and may be cast integral therewith as shown in Figures 1 and 2. The reservoir contains a body of hydraulic fluid 33 and the reservoir may be filled by removal of a conventional cap 34. The bottom of the reservoir communicates through an outlet port 35 with a longitudinal passage 36 the ends of which are enlarged as at 37 and 38 forming valve seats at the ends of the central portion of the passage 36 adapted to be engaged and closed by valves 39 and 40, shown in the present instance as being ball valves.

The valves 39 and 40 are urged toward their seats by compression springs 44 and 45 respectively, these springs seating at their remote ends against plugs 46. The parts normally occupy the off position shown in Figure 1, and attention is invited to the fact that under such conditions, both springs 44 and 45 are unloaded, that is, they are fully extended under their own tension and under such conditions they engage the valves 39 and 40 but do not exert any force thereagainst tending to seat these valves. The ball valves are normally maintained off their seats by a rod 48, the length of which is such as to maintain the ball valves in engagement with their respective springs, but without compressing such springs. Therefore, the central passage portion 36, in the off positions of the parts, remains in communication with both of the enlarged passage portions 37 and 38.

The inner extremities of the pistons 11 and 12 are preferably formed by double lipped cups 50, which, of course, are conventional. Adjacent the cups 50 are ports 51 and 52 respectively, these ports affording communication between the enlarged passage portions 37 and 38 and the hydraulic fluid chamber 26 adjacent the respective cups 50 as shown in Figure 1.

An operating rod 55 is pivotally connected at one end as at 56 to the head 23. The rod 55 is adapted to be actuated in either direction by suitable means utilized for operating the brakes. For example, any suitable means (not shown) forming no part of the present invention may be utilized for taking off power from the propeller shaft of the motor vehicle to operate the rod 55. This rod, therefore, will be operated in one direction when the vehicle is moving forwardly and will be moved in the opposite direction when the vehicle is moving rearwardly.

*Operation*

The parts normally occupy the positions shown in Figure 1 and it will be apparent that the reservoir is in communication with the hydraulic fluid chamber 26 through passage 36, passages 37 and 38 and ports 51 and 52, both of the latter ports being open when the pistons 11 and 12 are in their off positions.

Assuming that the brakes are to be operated, and assuming that the vehicle is going forwardly in which case actuation of the rod 55 will take place toward the right, the brake pedal will be operated to connect the rod 55 mechanically to the power take-off means associated with the propeller shaft. When the rod 55 moves toward the right, the head 23 will engage the end 24 of the piston 11 and move this piston toward the right. At the same time, the rod 19 will slide through the head 22 of the piston 12, this piston being prevented from moving toward the right by the stop cap 14. Slight initial movement of the piston 11 toward the right will cause its cup 50 to close the port 51, thus disconnecting the chamber 26 from the passage 37. At the same time pressure will be built up in the chamber 26 by the piston 11, and this pressure will act against the ball 40 to seat this ball, the rod 48 moving toward the left to slightly move the ball 39 to the extent necessary for the ball 40 to seat, the spring 44 being slightly compressed in this operation. Accordingly, the chamber 26 also will be closed to communication with the reservoir by the ball 40, and the chamber 26 now becomes a closed chamber from which fluid can be displaced by movement of the piston 11. The fluid will move through port 27 and into the pipe lines leading to the brake cylinders.

When the brake pedal is released, the rod 55 will be mechanically disconnected from the propeller shaft and the spring 18 will move the piston 11 back to its normal off position shown in Figure 1. When this position is reached, pressures will be balanced in the passages 37 and 38, and the balls 39 and 40 will return to their normal positions, slightly off their seats, thus connecting both ends of the chamber 26 to the reservoir to replace any fluid which may have leaked from the system in the previous brake operation. This communication with the reservoir, of course, also takes care of expansion and contraction of the liquid in the system.

Assuming that the vehicle is moving in reverse, operation of the brake pedal will result in moving the rod 55 toward the left. Under such conditions, the rod 19 will slide through the piston 11 and the head 21 of the screw 20 will actuate the piston 12, this piston moving toward the left. Initial movement of the piston 12 will cause its cup to close the port 52, and pressure in the chamber 26, acting through port 51, will seat the ball valve 39, the rod 48 moving the ball 40 to permit this operation to take place, and slightly compressing the spring 45 during such operation. The piston 12 will then act to displace fluid from the chamber 26 into the brake lines and the brakes will be applied in exactly the same manner as before.

While a direct connection through port 27 between the chamber 26 and the brake lines has been illustrated, it will be obvious that a conventional residual pressure valve may be employed in the lines. Such a valve forms no part of the present invention and may be conventional in its construction.

From the foregoing it will be apparent that the present invention contemplates the use of a single master cylinder unit with two pistons therein, selectively operable by a single operating element in accordance with the direction of movement of the latter. Therefore, the arrangement permits the use of power taken off from the propeller shaft of a motor vehicle, regardless of the direction of rotation of such shaft, for applying the brakes. Regardless of which piston is actuated, moreover, the matter of connecting the chamber 26 to the reservoir in the off positions of the pistons is effectively taken care of, and regardless of which piston is operated, the chamber 26 is disconnected from the reservoir as soon as brake operation starts. The unit provides highly simplified means for accomplishing its intended result and the size of the structure as a whole is not materially larger than a conventional master cylinder with its reservoir.

It is to be understood that the construction shown is illustrative and that the invention is defined in the appended claims.

I claim:

1. A master cylinder structure for braking systems comprising a cylinder, a pair of pistons in said cylinder, the space between said pistons forming a hydraulic chamber having an outlet communicating with the brake lines, and a single operating member for said pistons projecting axially therethrough and slidable with respect thereto, said operating member having shoulders engageable with the remote ends of said pistons whereby movement of said member in one direction will actuate one of said pistons and movement in the other direction will operate the other of said pistons.

2. A master cylinder structure for braking systems comprising a cylinder, a pair of pistons in said cylinder, the space between said pistons forming a hydraulic chamber having an outlet communicating with the brake lines, a single operating member for said pistons projecting axially therethrough and slidable with respect thereto, said operating member having shoulders engageable with the remote ends of said pistons whereby movement of said member in one direction will actuate one of said pistons and movement in the other direction will operate the other of said pistons, a reservoir, passage means affording communication between said reservoir and said chamber when said pistons are moved apart to predetermined normal positions, and means operative upon movement of either of said pistons upon movement of said operating member in one direction for disconnecting said chamber from said reservoir.

3. A master cylinder structure for a hydraulic brake system, comprising a cylinder, a pair of pistons therein, the space between said pistons forming a hydraulic chamber communicating with the brake lines, means biasing said pistons away from each other, stop means limiting such movement of said pistons to normal positions, common operating means for said pistons, said operating means being movable in one direction to move one of said pistons and in the other direction to move the other of said pistons to reduce the capacity of said chamber and displace fluid into the brake lines, a reservoir, passage means communicating with said reservoir, said cylinder being provided with a pair of ports in close proximity to the respective pistons and communicating with said passage means when said pistons are in said normal positions, check valves in said passage means normally open when said pistons are in said normal positions and each being movable away from one of said ports to closed position whereby, upon movement of either piston away from normal position, such piston will close the associated port and generate pressure in said chamber acting against the check valve associated with the other port to close communication through such other port between said cylinder and said reservoir.

4. A master cylinder structure for braking systems comprising a cylinder, a pair of pistons in said cylinder, there being a space between said pistons comprising a hydraulic chamber having an outlet for communication with the brake lines, means biasing said pistons away from each other to normal positions, means for selectively moving said pistons to reduce the volume of said chamber to displace fluid into the brake lines, a reservoir, passage means communicating with said reservoir, said cylinder being provided with a port adjacent each piston when the latter is in normal position, communicating with said passage means, a pair of opposed valve seats in said passage means, a valve associated with each seat, and means biasing each valve to a position in proximity to but not in engagement with its seat, whereby, upon movement of either piston away from its normal position, the associated port will be closed and pressure generated in said chamber will act on the valve exposed to the other port to seat such valve and cut off communication between said chamber and said reservoir.

5. A master cylinder structure for braking systems comprising a cylinder, a pair of pistons in said cylinder, there being a space between said pistons comprising a hydraulic chamber having an outlet for communication with the brake lines, means biasing said pistons away from each other to normal positions, means for selectively moving said pistons to reduce the volume of said chamber to displace fluid into the brake lines, a reservoir, passage means communicating with said reservoir, said cylinder being provided with a port adjacent each piston when the latter is in normal position, communicating with said passage means, a pair of opposed valve seats in said passage means, a valve associated with each seat, and a rod in said passage means between said valves and engaging said valves, said rod being of such length as to normally maintain both valves off their seats whereby, upon movement of either piston away from its normal position, such piston will close the associated port and the valve exposed to the other of said ports will be moved to closed position by pressure generated in said chamber.

6. A master cylinder structure for braking systems comprising a cylinder, a pair of pistons in said cylinder, there being a space between said pistons comprising a hydraulic chamber having an outlet for communication with the brake lines, means biasing said pistons away from each other to normal positions, means for selectively moving said pistons to reduce the volume of said chamber to displace fluid into the brake lines, a reservoir, passage means communicating with said reservoir, said cylinder being provided with a port adjacent each piston when the latter is in normal position, communicating with said passage means, a pair of opposed valve seats in said passage means, a valve associated with each seat, a rod loosely arranged between said valves in engagement therewith and of such length as to be capable of holding both valves slightly away from their seats, and a spring in said passage means behind each valve to urge the latter toward closed position, said springs being of the compression type and of such length when unloaded as to hold said valves in engagement with said rod without closing either valve.

7. A master cylinder structure for braking systems comprising a master cylinder, a pair of spaced pistons in said cylinder, a compression spring engaging at opposite ends against said pistons to bias them to normal positions, the space between said pistons forming a hydraulic chamber having an outlet communicating with the brake lines, a rod slidable axially through said pistons and having heads engaging the remote sides of said pistons whereby movement of said rod in either direction will move one of said pistons to reduce the volume of said chamber, a relatively small longitudinal passage adjacent said reservoir and communicating intermediate its ends therewith, a relatively large longitudinal passage at each end of and axially alined with said first-named passage, said relatively large passages extending longitudinally away from said first-named passage, the inner ends of said relatively large passages forming with said first-named passage a pair of valve seats, said cylinder having a port communicating therewith adjacent each of said pistons, said ports communicating with the respective relatively large passages, a valve engageable with each of said seats, a rod extending loosely through said relatively small passage and engaging said valves, such rod being of such length as to normally unseat said valves, and a spring in each of said relatively large passages engaging the associated valve to maintain it in engagement with the adjacent end of said last-named rod.

References Cited in the file of this patent

UNITED STATES PATENTS

| 1,815,157 | Loughead | July 21, 1931 |
| 1,902,876 | McEachern | Mar. 28, 1933 |
| 2,107,257 | Beusch | Feb. 1, 1938 |

FOREIGN PATENTS

| 201,795 | Great Britain | Aug. 9, 1923 |
| 779,383 | France | Jan. 14, 1935 |